(12) United States Patent
Lee

(10) Patent No.: US 6,219,229 B1
(45) Date of Patent: Apr. 17, 2001

(54) MULTIFUNCTIONAL COMPUTER

(76) Inventor: Len-Ho Lee, 4F, No. 7, Alley 1, Lane 109, Hsin Hai Road, Pan Chiao, Taipei (TW)

( * ) Notice: Subject to any disclaimer, the term of this patent is extended or adjusted under 35 U.S.C. 154(b) by 0 days.

(21) Appl. No.: 09/407,093

(22) Filed: Sep. 28, 1999

(51) Int. Cl.[7] .............................. H05K 7/00; H05K 5/03; H04N 5/64
(52) U.S. Cl. ...................... 361/683; 361/682; 361/685; 361/686; 361/687; 361/724; 361/725; 364/708.1; 439/61
(58) Field of Search ..................... 361/682–687, 361/725–727, 784, 785, 788, 796, 801–803, 724; 439/61, 65, 152–160, 928, 928.1; 364/708.1; 360/97.01, 98.01, 137, 137 D, 99.06; 369/75.1–82; 165/80.2, 80.3, 185; 312/332.1, 333

(56) References Cited

U.S. PATENT DOCUMENTS

| | | | |
|---|---|---|---|
| D. 373,573 | * | 9/1996 | Basco et al. ................. D14/100 |
| 4,803,652 | * | 2/1989 | Maeser et al. ................. 364/708 |
| 4,832,419 | * | 5/1989 | Mitchell et al. ................. 312/7.2 |
| 4,980,676 | * | 12/1990 | Nomura et al. ................. 340/700 |
| 5,021,763 | * | 6/1991 | Obear ................. 340/407 |
| 5,107,402 | * | 4/1992 | Malgouires ................. 361/393 |
| 5,157,585 | * | 10/1992 | Myers ................. 361/380 |
| 5,175,672 | * | 12/1992 | Conner et al. ................. 361/393 |
| 5,187,645 | * | 2/1993 | Spalding et al. ................. 361/393 |
| 5,305,183 | * | 4/1994 | Teynor ................. 361/686 |
| 5,351,176 | * | 9/1994 | Smith Stephen et al. ........... 361/681 |
| 5,426,564 | * | 6/1995 | Hsu ................. 361/707 |
| 5,430,607 | * | 7/1995 | Smith ................. 361/683 |
| 5,461,717 | * | 10/1995 | Notarianni et al. ................. 395/200 |
| 5,666,264 | * | 9/1997 | Chandler et al. ................. 361/683 |
| 6,025,989 | * | 2/2000 | Ayd et al. ................. 361/695 |
| 6,049,449 | * | 4/2000 | Cranston, III et al. ........... 361/683 |

FOREIGN PATENT DOCUMENTS

4107809 * 9/1992 (DE) ................. G06C/5/02

* cited by examiner

*Primary Examiner*—Leo P. Picard
*Assistant Examiner*—Anatoly Vortman
(74) *Attorney, Agent, or Firm*—Rosenberg, Klein & Lee

(57) ABSTRACT

A multifunctional computer have a computer case. One side of the front surface of the case is installed with a data input/output device region having a plurality of spaces for being arranged with different devices a system monitor, a disk driver (a hard disk driver, a floppy disk driver, a compact disk driver), a kara OK, a modem (facsimile, telephone), power supply receptacles, a plurality of interface connector board (a SCSI bus, RS232 series ports, USB, PS/2, network connectors, audio A/V terminals), an uninterrupted device (UPS), a power supply, a radiator, etc. A liquid crystal display is installed at the surface of the case. At the side of the data input/output device region, the display is pivotally and detachably connected to the case at another side thereof. An openable door plate is installed within the display. After the door plate is opened, an upright motherboard is installed. A display is embedded in the board. Two sides of the board have trumpets. A part of the case at the lower side of the display is formed with two drawers for receiving a keyboard (the lower one) and a thin printer or scanner (the upper one). Moreover, a second radiator and a second power supply can be installed.

9 Claims, 5 Drawing Sheets

MULTIFUNCTIONAL COMPUTER

FIELD OF THE INVENTION

The present invention relates to a multifunctional computer, and especially to a transversal table computer assembled with many peripheral devices.

BACKGROUND OF THE INVENTION

A prior art computer is primarily formed by a mainframe, a display, a keyboard, a printer, etc. Since network is more and more popular, modems have become a necessary device. Thus, other applications, such as electronic fax, E-mail, E-phone, teleconference, etc, are generated. In order to suit the unstability of power supply, an interrupted power supply (UPS) is installed in a computer. Since the development of network, the devices, such as a camera, a micro type camera (CCD), trumpets, microphones, even hidden type camera, are more and more popular in the computer. These devices are sufficient to fill the whole table surface. Moreover, as the number of devices is increased, the new devices are necessary to be installed in the computer, or the installed devices are necessary to be updated. Since some devices, such as retractable hard disk, built-in hard disk, optic disk drive, DVD, 3.5 inches floppy disk, etc., are installed in the computer, in general, the case of the computer is necessary to be detached, only the case frame is left. This is inconvenient, specially since the display becomes larger and larger. Furthermore, the mainframe occupies a large space. Therefore, the space on the table becomes smaller. In order to solve the problem, the liquid crystal display (LCD) is developed. However, since the LCD is used independently, a large space is still occupied. A notebook can solve such a problem, but for many peripheral devices, the notebook computer can not be adapted. Moreover, we must sacrifice the advantage of the table computer by trading for the notebook computer. Therefore, there is an eager demand for a device which can integrate the computer and peripheral devices compactly so as to save space.

SUMMARY OF THE INVENTION

Accordingly, the primary object of the present invention is to provide a multifunctional computer. Thereby, the peripheral devices required by the computer can be arranged conveniently with a minimum space so as to be formed with a table type transversal computer. The volume of the present invention is slightly larger than the current mainframe and includes all the required functions. The space for the screen is also saved. The required devices can be assembled to the preset positions within the case. The present invention can be installed in the box. Then, since the whole body is a box, thus, it can be moved easily. The problem of too many wires connected to the computer can be resolved. Therefore, the present invention is formed as an integrated type device. The main body is arranged as a wide and flat body instead of the original thin body. Namely, the original lateral surface becomes a front surface, while the original front surface is still a front surface. The inner space is used sufficiently for receiving a plurality of devices. The general device, such as mother board, is still used.

In the present invention, a multifunctional computer has a computer case. One side of the front surface of the case is installed with a data input/output device region having a plurality of spaces being arranged with different devices, such as a system monitor, a disk drive (a hard disk drive, a floppy disk drive, a compact disk drive), a kara OK, a modem (facsimile, telephone), power supply receptacles, a plurality of interface connector boards (SCSI bus, RS232 series ports, USB, PS/2, network connector, audio A/V terminal), an uninterrupted power supply (UPS), a power supply, a radiator, etc. A liquid crystal display is installed at the surface of the case at the side of the data input/output device region. The display is pivotally and detachably connected to the case at another side thereof. An openable door plate is installed within the case. After the door plate is opened, an upright motherboard is installed. A display is embedded in the surface of the case. Two sides of the surface provided with trumpets. A part of the case at the lower side of the display is formed with two drawers for receiving a keyboard (the lower one) and a thin printer or scanner (the upper one). Moreover, a second radiator and a second power supply can be included therein.

The various objects and advantages of the present invention will be more readily understood from the following detailed description when read in conjunction with the appended drawings.

DETAILED DESCRIPTION OF THE PREFERRED EMBODIMENTS

Figure 1:
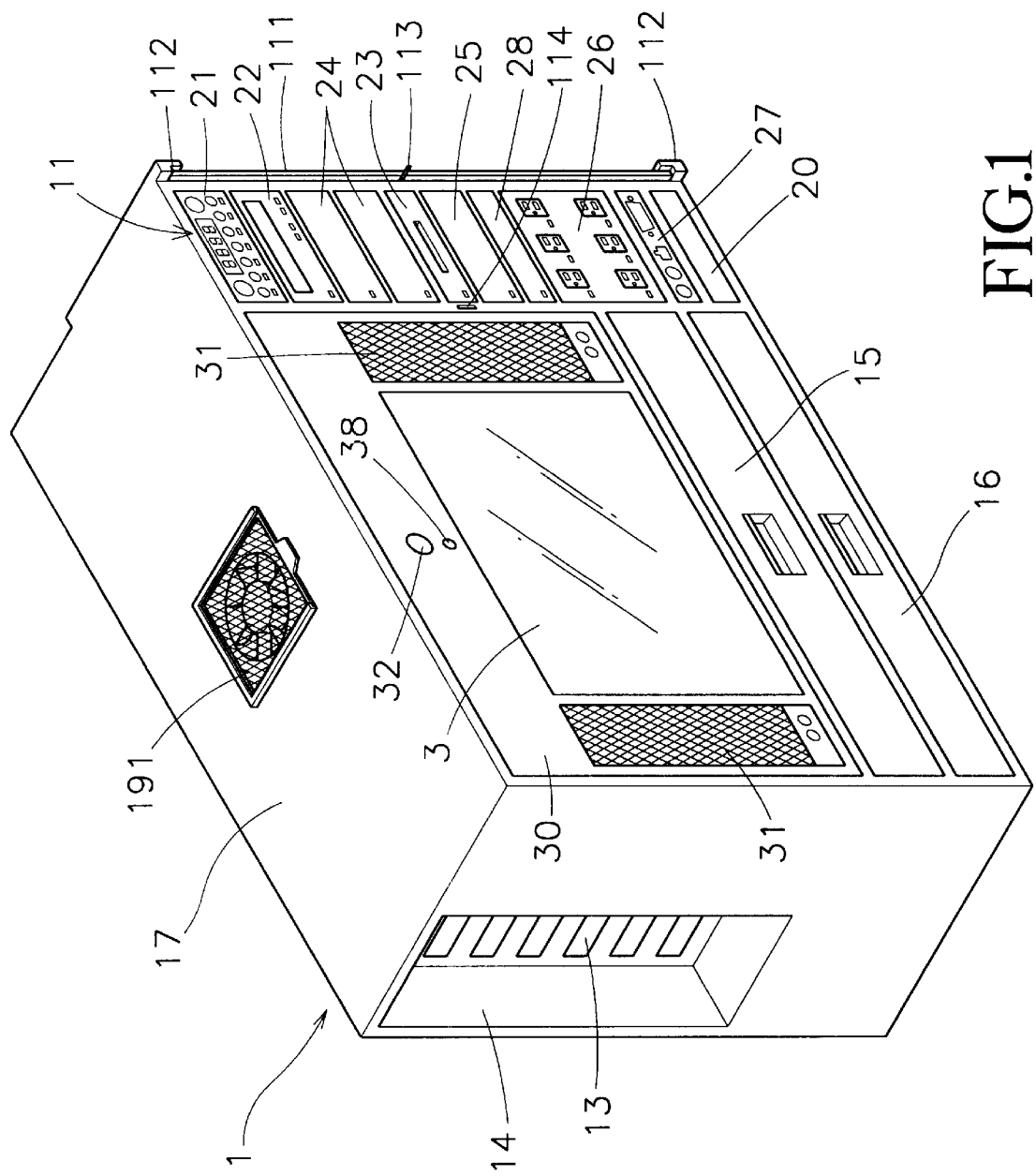
FIG. 1 is a perspective view of the present invention.
Figure 5:
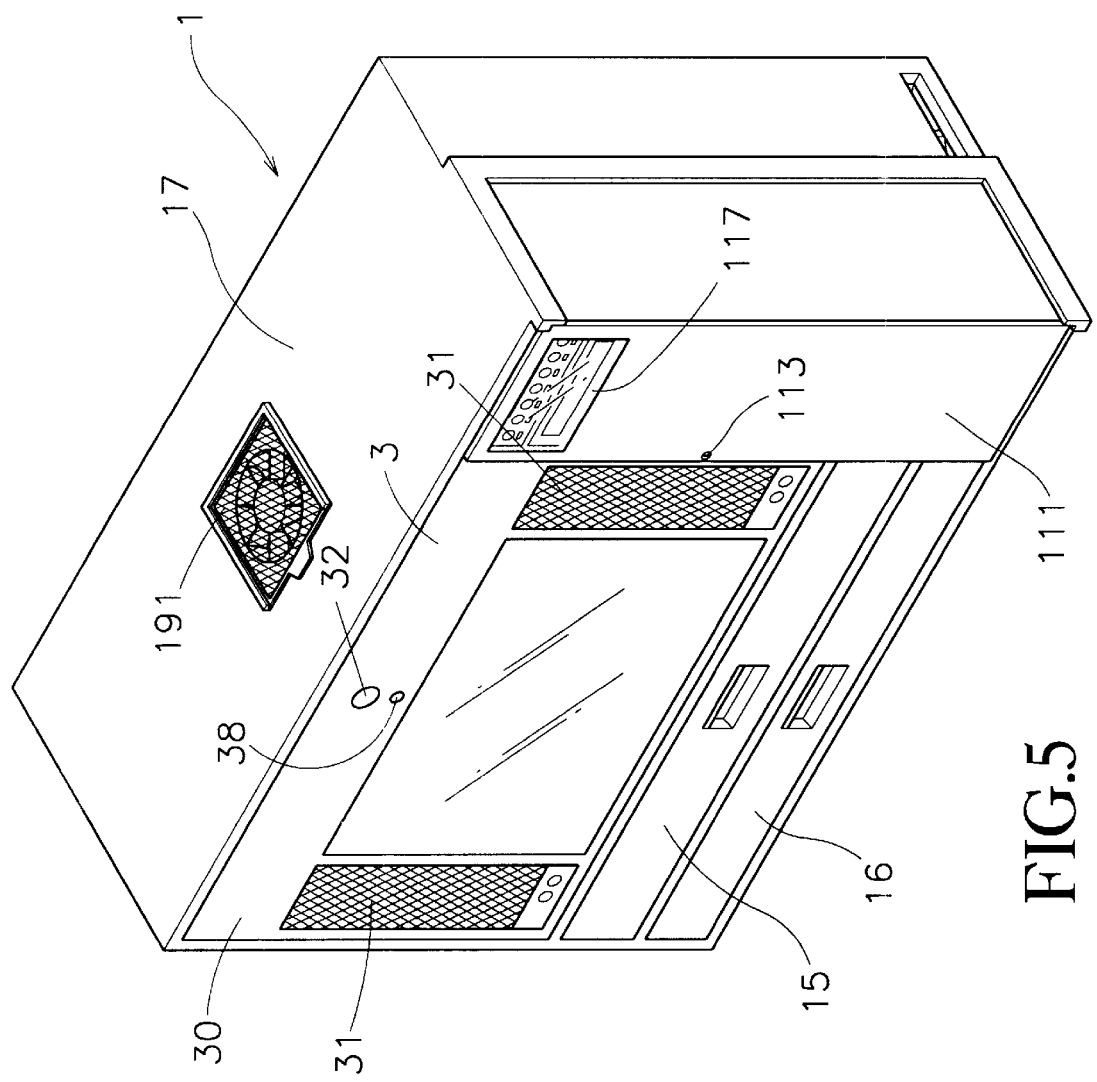
FIG. 5 is an another perspective view of the present invention.

With reference to FIGS. 1 and 5, the multifunctional computer of the present invention is illustrated. The multifunctional computer has a computer case 1. The front surface of the case 1 has a data input/output device section 11, which comprises a plurality of retractable spaces being arranged with a system monitor 21, a hard disk (a hard disk (HD) 24, a 3.5 inches floppy disk (FD) 23, a CD-ROM 22 or a VCD, or a DVD), a kara OK, a modem 25 (a facsimile machine, a telephone), a plurality of power supply receptacles on a multiple power supply board 26, a plurality of interface connector boards 27 (a SCSI bus, RS232 series ports, USBs, PS/2, network connectors, audio A/V terminals and other expansion devices), an uninterrupted power supply (UPS) 28, a power supply 29, a radiator 20, etc. The system monitor 21 has a bank of LED indicators (lower side) and a bank of switches (upper side) for displaying the operation of a plurality of peripheral devices or the power state so that the operation and maintenance of the devices may be conveniently implemented.

Figure 2:
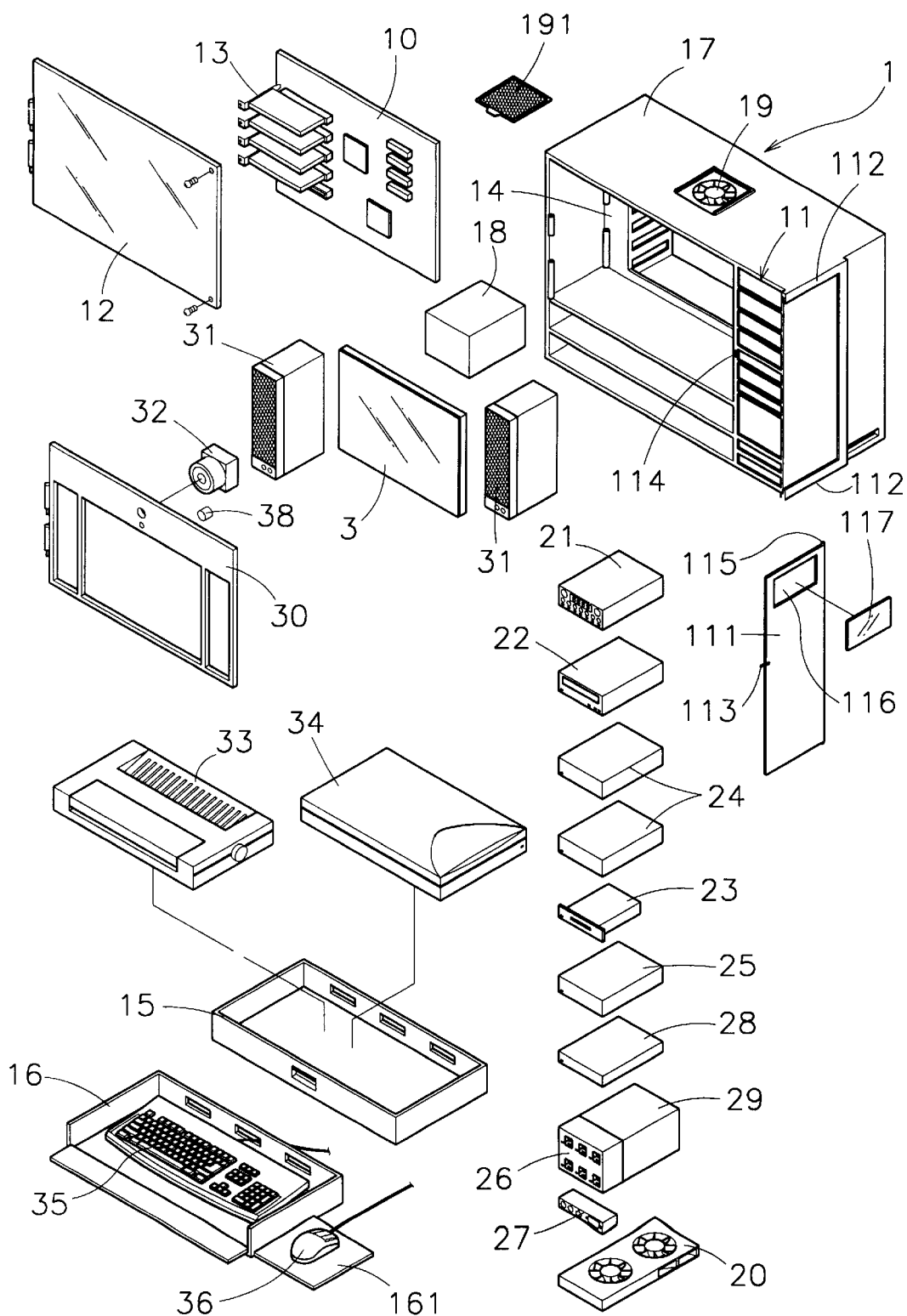
FIG. 2 is an exploded perspective view of the present invention.
Figure 3:
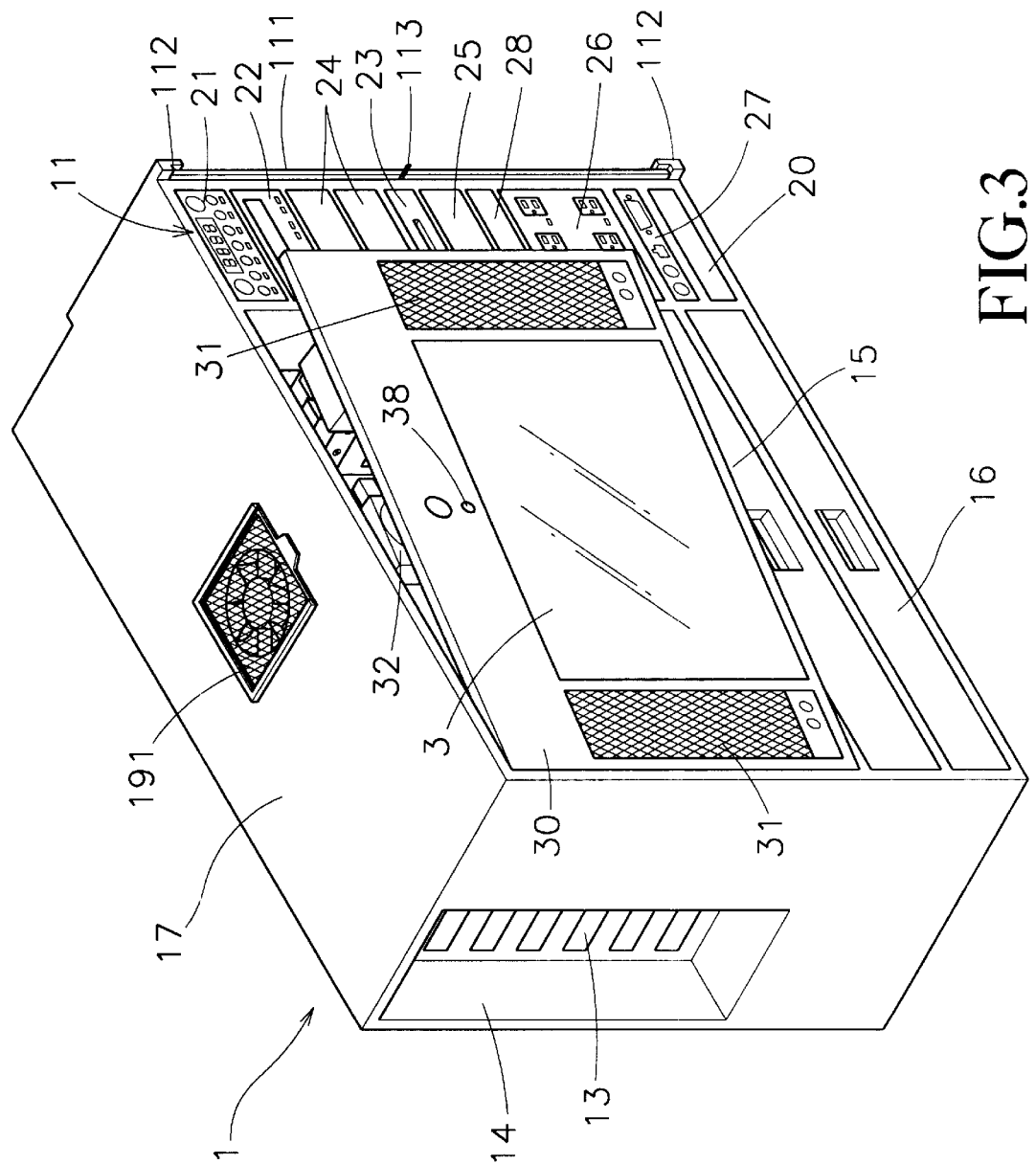
FIG. 3 is a perspective view of the present invention with opened display.

A liquid crystal display (LCD) 3 is installed at a surface parallel to the case 1. Another side of the LCD 3 is pivotally and detachably connected to the case 1. An openable door plate 12 (which is detachable and has one side rotatable and one side locked as shown in FIG. 2, and may be transparent as shown in the figure) is installed within the case 1. An upright mother board 10 and related interface cards 13 are installed behind the door plate 12. The outer end of each interface card 13 is connected to the plate 14 of an inwardly reduced part of the case 1. The LCD 3 can be embedded into a panel 30, two sides of which provided with trumpets 31, respectively. The panel 30 has a micro type camera (CCD) 32 and a microphone 38. The lower side of the panel 30 in the case 1 is formed with two drawers 15 and 16. The drawer 15 serves to receive a thin printer 33 or a scanner 34 (if desired, it can be divided by two layers for arranging objects). The lower drawer 16 (the front panel of the drawer can be turned downwards to be formed as a flat hand locating portion) being arranged with a keyboard.

Figure 4:
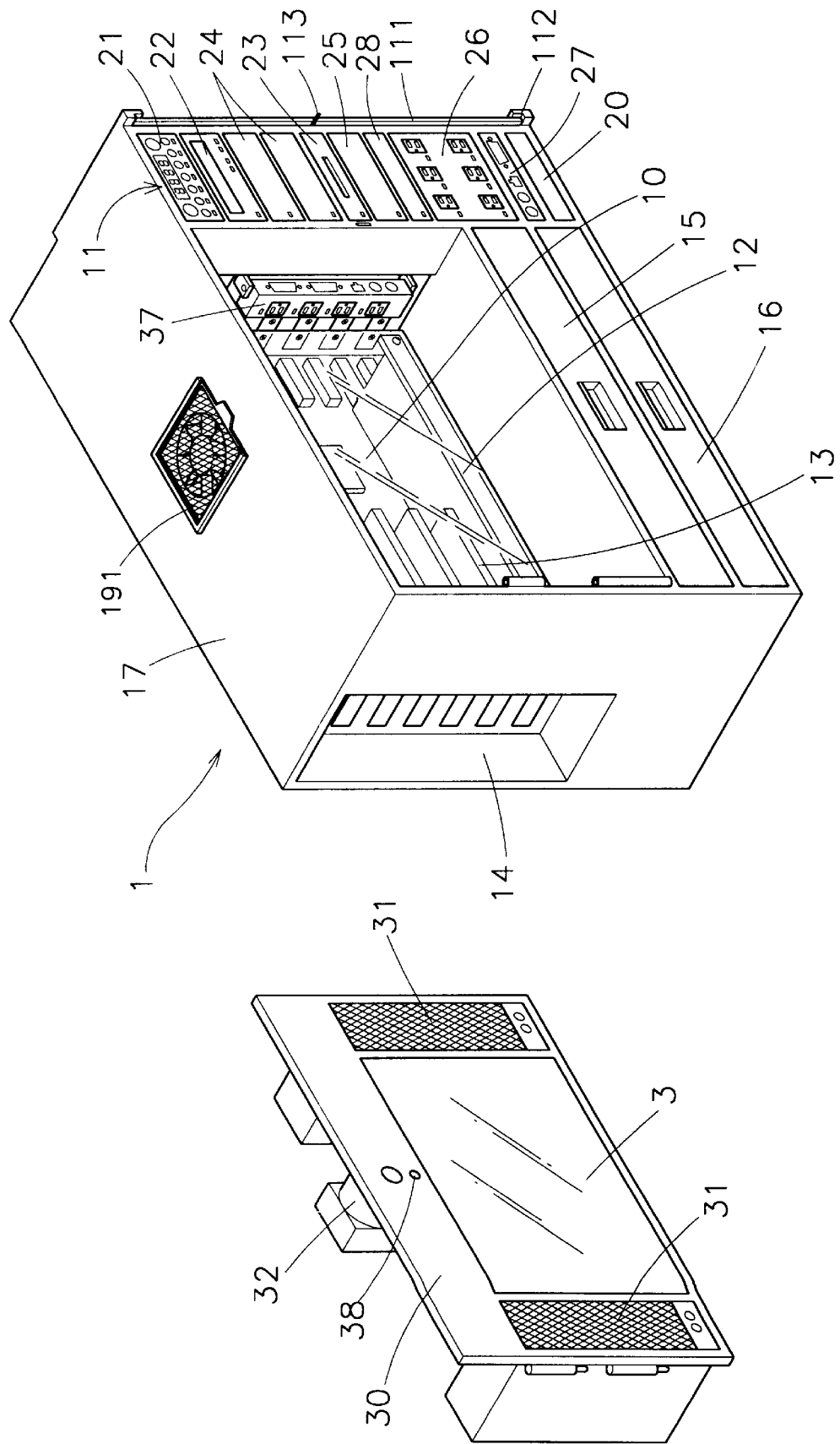
FIG. 4 is a perspective view showing the maintenance of the present invention.

The part of case 1 at the display can be further divided for receiving a second radiator 19 and a second power supply 18. The second radiator 19 protrudes from the top 17 of the case 1 and has a retractable filtering net 191. After the side of the drawer 16 is pulled out transversally, a mouse plate 161 can be retracted. A mouse 36 is connected to the connector plate 27. The line of the keyboard 35 can be connected to the connector plate 27 (a plug-in interface) or to a connecting seat installed on the mother board 10. Similarly, the power to the printer 33 and to the scanner 34 is provided from the receptacles of the multiple power supply board 26. Signal lines are connected to the connector board 27 or to a connector of the interface card. The structure similar to the power supply board 26 and the connector board 27 can be installed at a rotatable build-in (multiple power sources and multiple connectors) interface 37 (as shown in FIG. 4, it is installed outside the door plate, however, it can be installed inside the door plate 12). The power from the built-in interface 37 is supplied to the facsimile machine, modem, printer, scanner, UBS, trumpets, microphone, camera, and other devices. Therefore, the space for installing a plurality of transformers is saved. The power supply required is provided within the case 1, thus saving more space. The built-in interface 37 may contain different types of connectors for the signal lines of the aforesaid devices. Thus, the problem of multiple lines protruding out of the computer is resolved so that the quantity of the outer signal lines is reduced to a minimum. Related line spaces are not depicted in the figures, however, a proper line layout can be provided.

If the surface of the data input/output device region 11 is desired to be beautified, the one of the sides adjacent to the case 1 can be installed with respective guiding rails 112 at the upper and lower sides. The rotary shaft 115 of the cover 111 passes through the two guiding rails 112 so that after the cover 112 is pulled out, it can be rotated through 90 degrees. Thus, the cover 112 will cover the device region 11. Then, a buckling piece 113 is fixed to the fixing piece 114 of the device region 11 (as shown in FIG. 5). The upper groove 116 of the cover 111 is buckled with a transparent piece 117. Therefore, the user may view the system monitor 21 conveniently.

In summary, by the present invention, all the peripheral devices of a computer can be received within the case, providing an all-in-one design. By the present invention, the space is used efficiently. In the present invention, a high class LCD display is used to substitute the conventional screen type display. Moreover, such display is combined with the mother board of the computer, while all the peripheral devices are still used with the front faces of these devices facing to the user. Therefore, the back side of the present invention can be adhered to the wall at the far side of the table. The present invention is more attractive and more convenient than prior art devices. If a large printer or scanner is required, the expansion device of the present invention can be used. Thus, the form of the present invention may solve the problem of space arrangement. It is important that the volume of the present invention is approximately equal to the mainframe.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multifunctional computer having a computer case, one side of the front surface of the case being installed with a data input/output device region having a plurality of spaces for being arranged with different devices; a liquid crystal display being installed at the surface of the case at the side of the data input/output device region, the display being pivotally and detachably connected to the case at another side thereof; an openable door plate being installed within the case behind the display, covering an upright motherboard installed therein; a part of the case beneath the lower side of the display being formed with at least one drawer for receiving a keyboard.

2. The multifunctional computer as claimed in claim 1, wherein the data input/output device region having a plurality of retractable spaces for being arranged with different devices including a system monitor, a hard disk (hard disk (HD), a 3.5 inches floppy disk (FD), a CD-ROM 22 or a VCD, or a DVD), a kara OK, a modem (a facsimile, a telephone), a plurality of power supply receptacles on a multiple power supply board, a plurality of interface connector board (a SCSI bus, RS232 series ports, USBs, PS/2, network connectors, audio A/V terminals and other expanding devices), an uninterrupted device (UPS), a power supply, a radiator, etc.

3. The multifunctional computer as claimed in claim 1, wherein the system monitor has a bank of LED indicators and a bank of switches for displaying the operation of a plurality of peripheral devices or the power state so that the operations and maintenance of the devices are convenient, moreover, a primary power supply and a temperature display board are installed thereon.

4. The multifunctional computer as claimed in claim 1, wherein the display is embedded into a panel, each of two sides of the panel has a trumpet, a micro type camera and a microphone are mounted on the board.

5. The multifunctional computer as claimed in claim 1, wherein the drawer is divided into a plurality of layers, the upper layer serves to locate a thin printer or scanner and the lower layer serves to locate a keyboard.

6. The multifunctional computer as claimed in claim 1, wherein the case is further installed with a second radiator and a second power supply.

7. The multifunctional computer as claimed in claim 1, wherein a replaceable filtering net is installed in the second radiator.

8. The multifunctional computer as claimed in claim 1, wherein a side adjacent to the case is installed with respective guiding rails at the upper and lower sides, a rotary shaft of a cover passes through the two guiding rails so that after the cover is pulled out, the cover will cover the device region.

9. The multifunctional computer as claimed in claim 1, wherein an inner lateral surface of the data input/output device region and an inner surface of a panel are installed with a built-in (multiple power supply and multiple connector) interface.

* * * * *